United States Patent [19]
Brassier et al.

[11] Patent Number: 5,589,730
[45] Date of Patent: Dec. 31, 1996

[54] MOTOR VEHICLE LIGHTING/INDICATING APPARATUS USING LUMINESCENT DISCHARGE

[75] Inventors: Marc Brassier, Vincennes; Jean-Claude Gasquet, Saint-Clement; Daniel Segaud, Paris; Bernard Mauroy, Roissy en Brie, all of France

[73] Assignee: Valeo Vision, Bobigny Cedex, France

[21] Appl. No.: 135,693

[22] Filed: Oct. 12, 1993

[30] Foreign Application Priority Data

Oct. 12, 1992 [FR] France .................. 92 12136

[51] Int. Cl.⁶ .................................... H01J 61/30
[52] U.S. Cl. .................... 313/493; 313/573; 313/582; 313/634
[58] Field of Search .................... 313/484, 485, 313/493, 573, 582, 610, 634, 113; 362/84

[56] References Cited

U.S. PATENT DOCUMENTS

| | | | |
|---|---|---|---|
| 4,430,597 | 2/1984 | Thompson | 313/113 |
| 4,612,473 | 9/1986 | Nilssen | 313/113 |
| 4,665,341 | 5/1987 | Imamura et al. | 313/493 |
| 4,721,875 | 1/1988 | Goudy, Jr. | 313/493 |
| 4,935,665 | 6/1990 | Murata | 313/113 |
| 5,272,410 | 12/1993 | Fox | 313/493 |

FOREIGN PATENT DOCUMENTS

| | | | |
|---|---|---|---|
| 523701 | 11/1953 | Belgium . | |
| 2046558 | 5/1971 | France . | |
| 3433151 | 3/1986 | Germany . | |
| 2217515 | 10/1989 | United Kingdom | H01J 61/30 |
| 2217905 | 11/1989 | United Kingdom | 313/493 |
| 9202947 | 2/1992 | WIPO | 313/493 |

Primary Examiner—Louis M. Arana
Assistant Examiner—Vip Patel
Attorney, Agent, or Firm—Morgan & Finnegan, LLP

[57] ABSTRACT

A lighting and/or indicating apparatus for a motor vehicle, of the type comprising an external light transmitting element and a base arranged behind the latter, typically consists of a lighting and indicating cluster. The light transmitting element comprises an outer panel, the base comprises an inner wall, and the two walls together constitute a thin gas-tight envelope and define at least one closed cavity. This cavity, or each cavity, contains two electrodes and a suitable gas under low pressure, the apparatus having means for applying voltage for starting and maintaining a luminescent gas discharge in the cavity, so that the envelope itself constitutes at least one light of the gas discharge type. The appearance and light output are improved, and the light beams emitted are highly homogeneous.

23 Claims, 3 Drawing Sheets

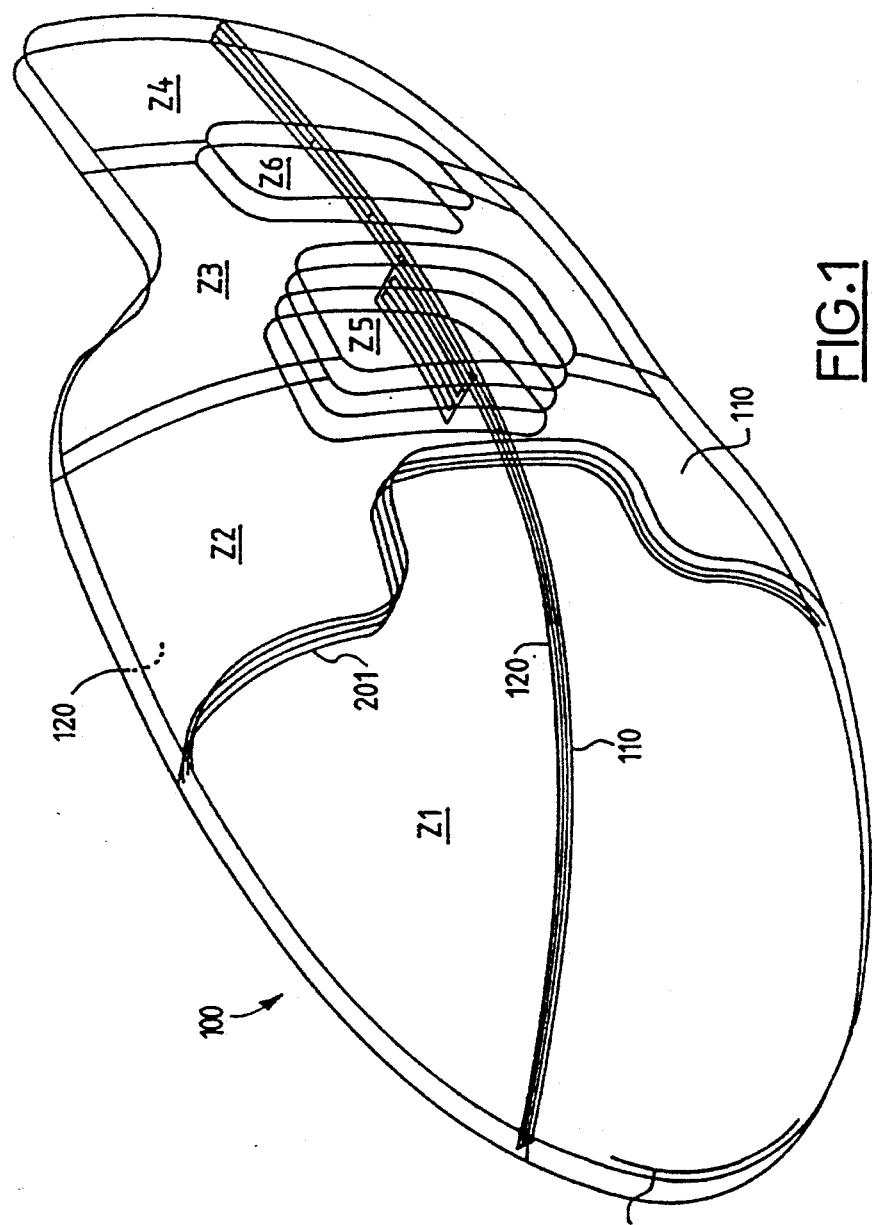
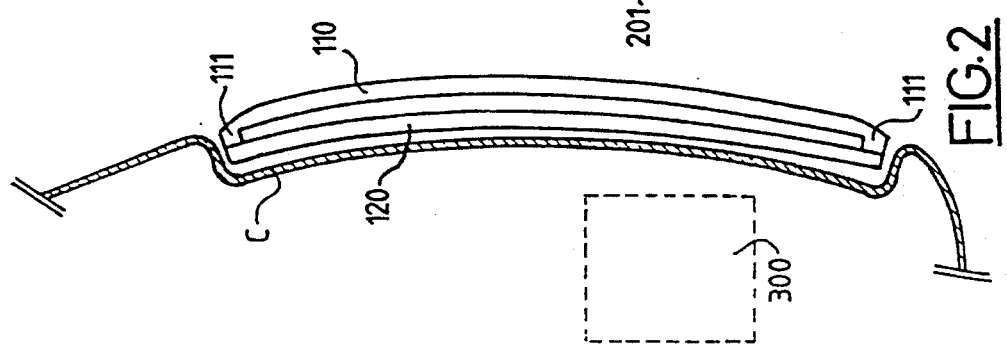

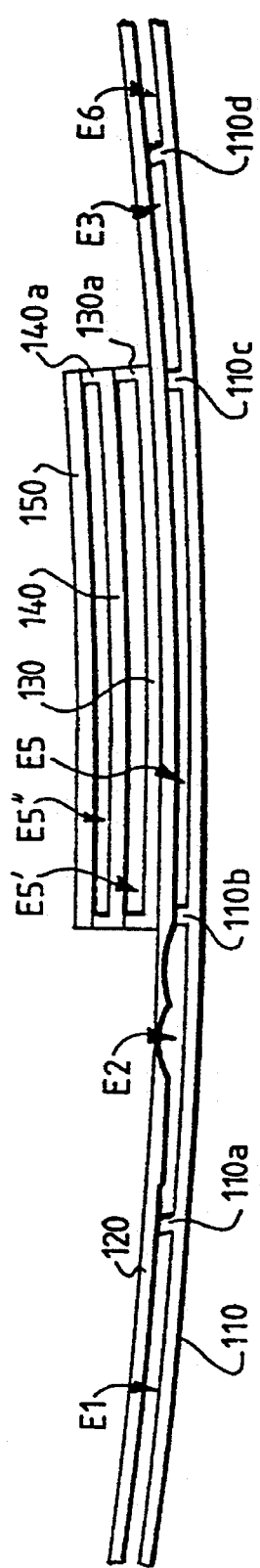
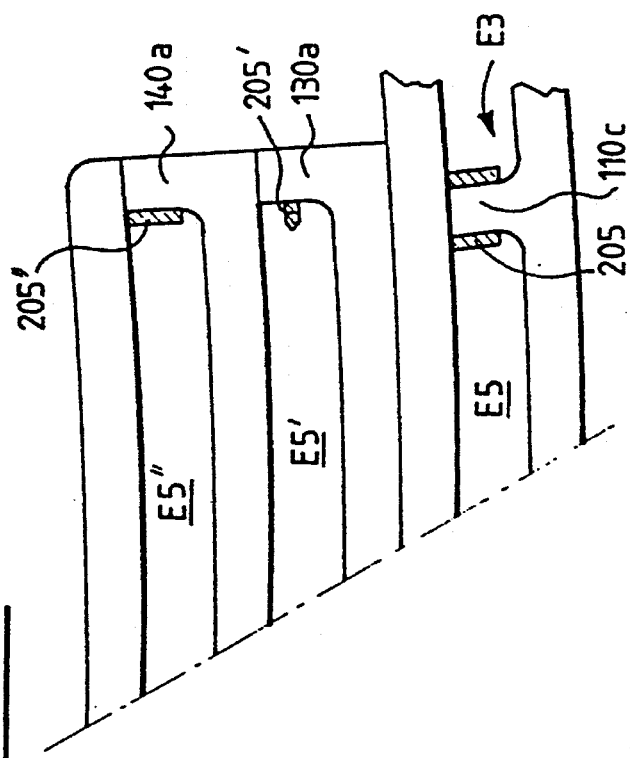
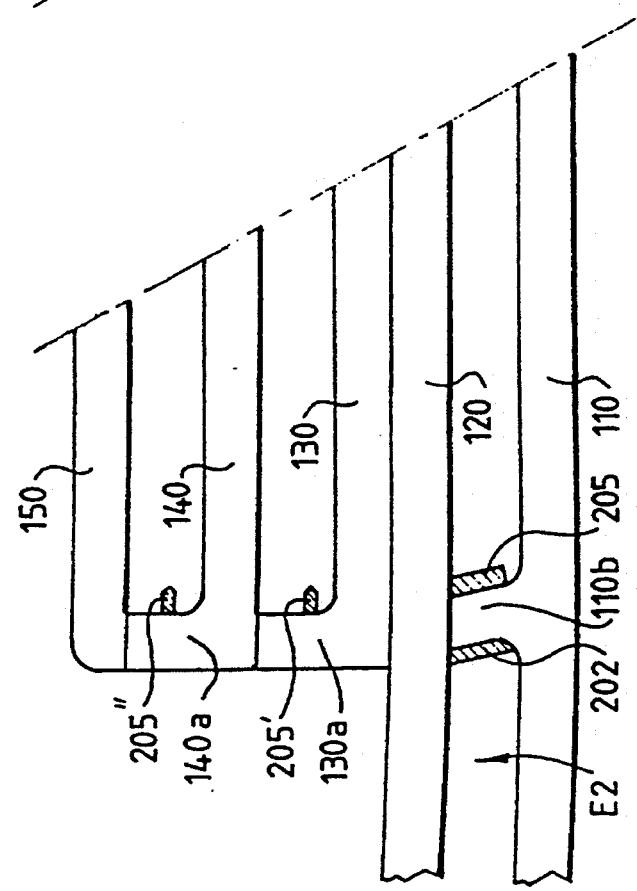
FIG.3a
FIG.3b

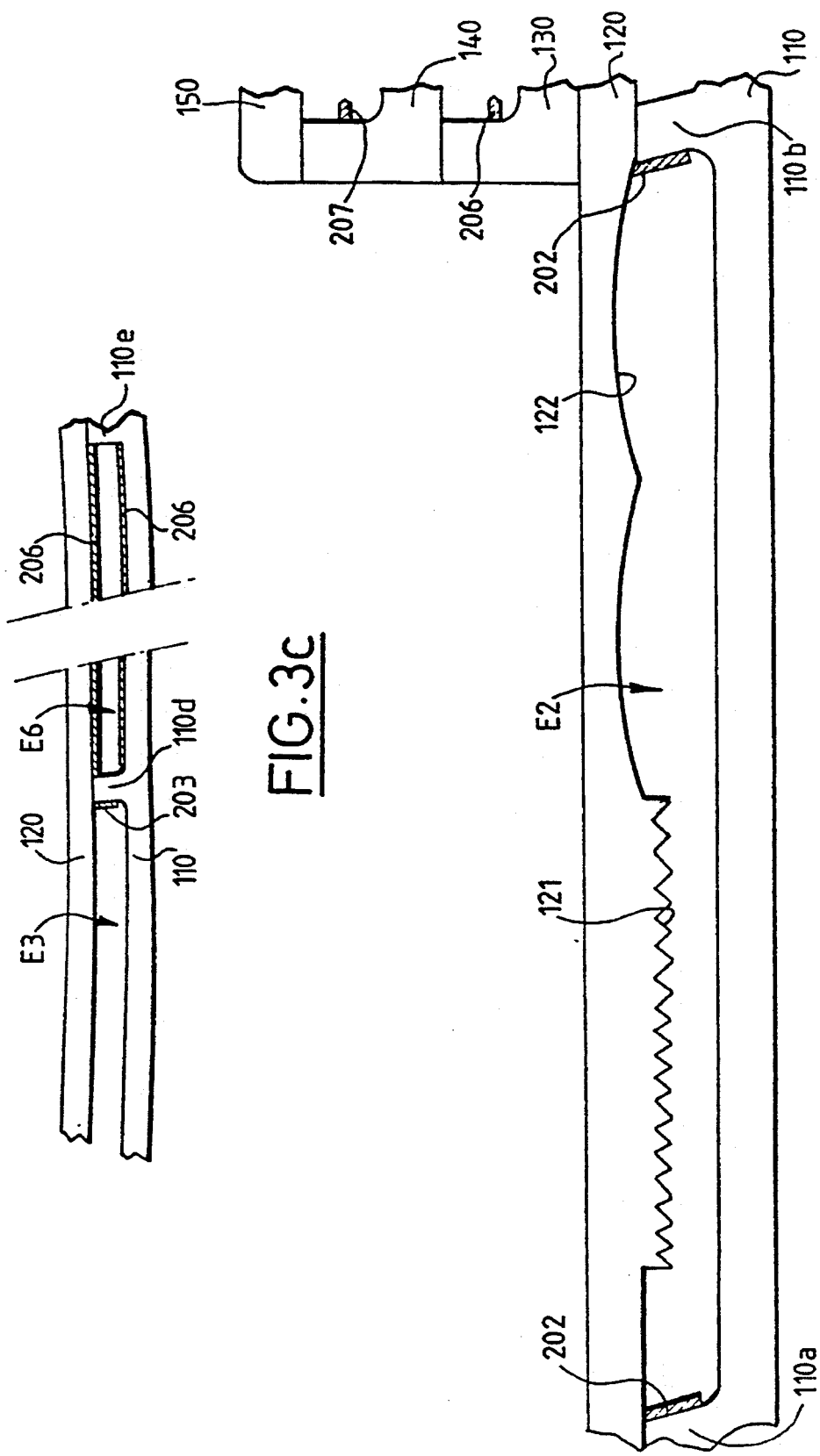

MOTOR VEHICLE LIGHTING/INDICATING APPARATUS USING LUMINESCENT DISCHARGE

FIELD OF THE INVENTION

The present invention relates, in general terms, to lighting and/or indicating (or signalling) apparatus for motor vehicles. More particularly, it is directed to a new concept for such an apparatus in the form of a multi-function lighting/indicating cluster, also referred to herein as a display unit.

BACKGROUND OF THE INVENTION

A lighting apparatus or indicating apparatus, for example apparatus for interior lighting, traditionally includes an opaque base plate which is provided with devices (lamp holders) at appropriate positions, for the fitting and electrical connection of one of more filament lamps. Such an apparatus also includes a light transmitting element in the form of a cover glass or globe which is fitted in front of the base plate (considered with respect to the direction in which light is emitted). The base plate and the cover glass may, conventionally, include light-controlling means for giving the beam or beams produced by the apparatus the required photometry. Such light-controlling means may for example be in the form of reflective elements on the base plate, or lenses, prisms or ribs on the cover glass. The apparatus may be arranged to emit one or more beams, and in particular signalling or indicating beams.

However, such a conventional arrangement has a certain number of drawbacks, in particular where the apparatus consists of, or includes, indicating (or signalling) lights. This is true both from the optical point of view and from the aesthetic point of view. First of all, in the optical context, it is quite difficult, especially for indicating functions where the illuminated zone of the apparatus has a large area, to obtain a homogeneous light intensity over the whole of this area. In particular, those regions of this illuminating zone which are furthest away from the filament will in general receive a quantity of light per unit of surface area which is smaller than that received by the region which lies immediately in front of the lamp; the light intensity in the illuminated zone decreases from its centre towards its edges.

In addition, from the aesthetic point of view, the light transmitting element (i.e. the cover glass) will be made in one or more colours (e.g. red, amber and so on), the colour being determined by the colour which the emitted beam is required to have. In addition, due to the fact that each indicating function may make it necessary to provide particular light-controlling means on the cover glass in order to give the emitted beam its required shape, the cover glass, when seen as a whole, usually looks extremely unhomogeneous when all the various lighting and/or indicating functions of the apparatus are extinguished.

Again, conventional lighting or indicating apparatuses generally give only a rather mediocre light output. Besides all this, filament lamps give rise to a substantial amount of heat, which in turn leads to design problems, especially in respect of the choice and dimensioning of the materials of components which are close to these lamps.

Finally, conventional lighting or indicating apparatus is relatively bulky, due especially to the fact that it is necessary to leave around the lamp a free space of significant size, mainly because of the heat which is produced as mentioned above.

It is also known to use a discharge lamp in a motor vehicle headlamp. Discharge lamps are well known for their high light output. However, since such a lamp emits very intense light radiation from a highly localised region, it is not itself suitable for overcoming the problems mentioned above.

DISCUSSION OF THE INVENTION

An object of the present invention is to overcome the disadvantages discussed above.

According to the invention, lighting or indicating apparatus for a motor vehicle, of the type comprising a translucent element and a base disposed behind the translucent element, is characterised in that it includes:

— a thin gas-tight envelope which comprises an outer wall constituting the said translucent element, and an inner wall constituting the said base, the said walls together defining at least one closed cavity;

— a gas contained at low pressure in the said cavity;

— at least two electrodes located in the cavity; and

— means for applying between the electrodes a voltage for starting and maintaining a luminescent gas discharge in the cavity.

Thus, in accordance with the present invention, the envelope of the apparatus, that is to say the equivalent of the combination of base plate and cover glass in the apparatus of the prior art, constitutes of itself a luminescent discharge cavity.

Further features, objects and advantages of the present invention will appear more clearly on a reading of the detailed description which follows, of a preferred embodiment of the invention, given by way of example only and with reference to the accompanying drawings.

BRIEF DESCRIPTION OF THE DRAWINGS

FIG. 1 is a diagrammatic perspective view showing the general contours of an indicator display unit in accordance with the invention.

FIG. 2 is a view in vertical transverse cross section of the display unit shown in FIG. 1.

FIGS. 3a to 3d are views in horizontal transverse cross section and on different scales, showing the same display unit as FIGS. 1 and 2.

DESCRIPTION OF A PREFERRED EMBODIMENT OF THE INVENTION

Referring to the drawings, these show an indicator display unit in which each indicator comprises essentially at least one envelope, defining within it a closed cavity. In the cavity at least two electrodes are disposed, these being connected to an appropriate high voltage source, and the envelope contains a gas or a mixture of gases under low pressure. The envelope preferably also constitutes the support for the indicator or group of indicators.

The luminescent discharge which is caused to occur in the cavity when a voltage is applied across the electrodes is distributed in the cavity in an extremely homogeneous manner. It will be understood that it is therefore possible to make the indicators so that the illuminated area which they present is itself homogeneous. Besides this, the display unit now to be described offers numerous other advantages, for example (and in particular) an improved light output, the fact that the whole apparatus has a very small thickness, and the fact that it generates very little heat.

Preferably, and as will be seen more clearly further on in this description, there are different cavities corresponding to different indicators, with each cavity being defined by common panel portions of the envelope, all of which are made integrally with each other.

The indicator display unit shown in the drawings comprises a plurality of illuminated zones Z1 to Z6, the illuminating functions of which are for example as follows:

zone Z1: amber direction indicator zone Z2: red stop light zone Z3: red position light (i.e. side light, parking light or rear light)

zone Z4: red fog light zones Z5 and Z6: white reversing light.

The envelope 100 of the display unit is defined essentially by an outer panel 110 and an inner panel (or base panel) 120 which extends parallel to the outer panel 100, from which it is spaced over the whole extent of the illuminated zones by an amount which is for example (and preferably) of the order of a few millimetres.

The outer panel 110 has an inwardly directed flange, indicated at 111 in FIG. 2 and extending over the whole periphery of the panel. The inner panel 120 is secured to this flange, to which it is also sealed.

In addition, the outer panel 110 has a set of inwardly directed ribs 110a to 110d (see FIG. 3), against which the inner panel 120 is also secured in a sealed manner. The rib 110a has for example a sinuous form, and defines the boundary between the flashing direction indicator light and the stop light. The rib 110b is essentially straight, and divides the stop light Z2 from the position light Z3 and also from the zone Z5 of the reversing light. The rib 110c, together with part of the rib 110b, defines the illuminated zone Z5 itself. This latter is of generally quadrilateral shape, and occupies a height which is smaller than the total height of the display unit as a whole at this point. Similarly, the ribs 110d and 110e are joined together, so as firstly to define the illuminated zone Z6 of the white reversing light, and secondly to separate the position light Z3 from the fog light Z4.

Thus the panel 110, with its peripheral flange and its ribs, together with the base panel 120, define a plurality of closed spaces or cavities E1 to E6, which correspond to the illuminated zones Z1 to Z6 respectively. Each of these cavities contains at least two electrodes, which may be of very diverse shapes and dimensions, as will be seen later on in this description. These electrodes are indicated by the reference numerals 201 to 206 for the cavities E1 to E6 respectively. The electrodes are connected in the usual way to ballasts 300, which are arranged to cause illumination to take place and to maintain illumination of the various indicating functions.

The ballasts may be disposed in any appropriate location. In a first embodiment, they can be mounted behind the display unit within the bodywork of the vehicle. In another embodiment, the inner panel 120 may be so designed as to define at least partially a specific cavity which contains the ballasts. In this latter case, the display unit is in the form of a monobloc unit which includes the ballasts.

As has been indicated, each individual indicator includes, by way of light source, a luminescent discharge which is produced throughout the whole of its cavity E. It follows that this gives rise to a homogeneous illumination of the relevant zone Z.

The gas or mixture of gases under low pressure contained in each cavity E1–E6 of the display unit is so selected that the luminescent discharge which is obtained operates directly or indirectly within the range of spectral wavelengths of colour required by the appropriate regulations for the particular lighting or indicating function concerned (these being typically red, amber or white). In order to obtain the colours red and amber, the gas may be so chosen that the luminescence gives the required colour directly.

However, it is difficult to obtain a white luminescent discharge. In this case, it is possible to provide in the cavity concerned (which in this example is the cavity E6 for the reversing light corresponding to the illuminated zone Z6) a fluorescent alkaline earth compound which reacts with the light discharge that occurs with a gas such as argon, so as to emit white radiation in the way which is well known for fluorescent tubes. Another way to obtain the colour white consists (as is illustrated for the zone Z5) in using three superimposed cavities, each containing a respective gas; these gases are so chosen that they emit light of the wavelengths of the three primary additive colours red, green and blue. The illuminated zone Z5 thereby, by additive synthesis, emits white light.

This arrangement in which there are three cavities behind the illuminated zone Z5 is shown more clearly in FIG. 3b, to which reference is now made, and in which the cavities are indicated at E5, E5' and E5" respectively, the last mentioned being the one furthest away from the outer panel 110. The cavity E5 is defined between the main panels 110 and 120 and the ribs 110b and 110c. The other two cavities E5' and E5" are defined by auxiliary panels 130, 140 and 150 which are carried on the back, or inner side, of the envelope 100 defined by the main panels 110 and 120. More precisely, one auxiliary panel 130, corresponding in size to the illuminated zone Z5, has an inwardly directed peripheral flange 130a, against which the other auxiliary panel 140 is fixed. The panel 110 has the same dimensions as the panel 130, and defines the middle cavity E5'. The panel 140 again has an inwardly directed peripheral flange, 140a, against which the innermost or terminal panel 150 is secured so as to define the rearmost cavity E5". The electrodes 205', 205" are disposed in these cavities.

Although FIG. 1 shows two zones Z5 and Z6, by way of example, in the same indicator (namely in this case the reversing light), emitting white light in two different ways, it will of course be understood that it is preferable to use the same technique for producing white light in each part of the indicator where the latter has more than one part.

One advantage of the additive synthesis solution for producing which light, as described above, lies in the fact that the light intensities of the three luminescent discharges are cumulative, so that the light which is emitted is particularly intense, as is indeed called for by the regulations. In addition, this design having superimposed cavities can also be used when any given lighting or indicating function (for example that of a stop light) is required to emit light of high intensity. For example, it is possible to superimpose on the cavity E2 which defines the red illuminated zone Z2 of the stop light, an additional cavity which is arranged again to emit red light, thus doubling the quantity of light produced through the zone Z2.

The outer panel 110 is of course made of a transparent material, or if desired a coloured translucent material, so as to allow the light generated to pass to the outside. As to the inner panel 120, this can also be transparent or translucent, but it may also be given any desired colour, and may for example be self-coloured, or coloured by varnishing, painting or in any other suitable way. Thus, when a light-emitting function is not activated, the low pressure gas being uncoloured, it is the colour of the base panel 120 which is visible.

This coloration of the base panel cannot be seen when the corresponding zone of the display unit is emitting light.

In addition, it is possible to design the internal surface of the base panel 120 in such a way that it performs a particular optical function. FIG. 3d, to which reference is now made, illustrates an example of this. In FIG. 3d, three catadioptric trihedra 121 are formed integrally with the base panel 120 in the cavity E2 of the stop light. The display unit is in this way given, when extinguished, the catadioptric function which is required by the regulations. These elements 121 are preferably provided with a reflective coating such as vacuum metallisation, in order to produce the required catadioptric retro-reflection. When the outer panel 110 in line with the elements 121 is uncoloured, this reflective coating can also be given the required colour, which is generally red or amber.

In a modification, suitable catadioptric elements may be provided on the inner face of the outer panel 110.

Optical reflectors may also be provided on the inner face of the base panel 120. FIG. 3e shows such reflectors at 122. These reflectors 122 are adapted to improve the light output for the lighting or indicating function concerned, by directing the light emitted by the luminescent discharge outwardly through the front panel 110. These reflectors 122 are concave as shown, and may also contribute to the reinforcement of the corresponding indicating beam along the main emission axis, which is generally parallel to the longitudinal axis of the vehicle.

The panels 110 and 120, and if appropriate the auxiliary panels 130, 140 and 150, may be made of glass, for example by moulding, pressing or even blowing. However, they are preferably made of a thermoplastic material, for example by high pressure or low pressure injection, or by extrusion or extrusion-blow methods. Other materials that may be used include, in particular, methyl polymethacrylate, polycarbonate, polystyrene, or mixtures of these plastics materials. Modified or grafted plastics materials may also be used, for example those used in connection with food storage, these materials being well known for their excellent gas sealing properties.

It is however also possible, of course, to use thermosetting plastics materials, in particular for those parts of the envelope which are not required to transmit visible light.

The envelope of the display unit may be made either as one piece, or, as shown, in the form of two main components or, in more general terms, two half shells which are secured together in a sealed manner. They can be secured together by one of the following conventional methods: hot mirror welding, vibration or ultrasonic welding, or adhesive bonding. The assembly does of course have to be perfectly sealed under vacuum conditions.

The optical elements 121, 122 described above are preferably made integrally at the time of forming the base panel 120.

The electrodes situated in the respective cavities are preferably cold cathodes, although hot cathodes can also be suitable, the cathodes being adapted as necessary to the requirements of the particular functions they are to perform. The cold cathodes are preferably made of copper, iron or silver, or of alloys based on these metals.

Referring once again to the drawings, the electrodes may be given a variety of shapes, dimensions and positions. In the case of the cavities E1, E2, E3 and E5—E5", the corresponding electrodes 201, 202, 203 and 205—205" are in the form of bands, the width of which is substantially equal to the thickness of the cavities in question. These bands are carried vertically on the two opposed side edges of the cavities, namely on the side faces in facing relationship with the corresponding ribs 110a to 110d. In a modification, it is of course possible to arrange them horizontally on the respective upper and lower edges of the cavities.

By way of non-limiting example, if the thickness of the cavities is of the order of 2 mm, the width of the band-shaped electrodes may be about 2 mm, with a thickness in the range 0.2 to 0.4 mm and a length in the range 50 to 100 mm, this length being chosen in particular as a function of the size of the associated cavity and the length of its opposed edges.

In addition, in the case of a cavity having a sinuous contour (such as the cavity E1), one of the electrodes 201 may match the shape of the separating rib 110a, extending along the whole of the latter, while the opposed electrode occupies a substantial part of the height of the display unit along the periphery of the front panel 110.

In addition, a pair of electrodes may be provided with one of the electrodes in the form of a band, or again with one electrode being in the form of a band and the other in the form of a point. This arrangement is illustrated in FIG. 3b, in which the opposed electrodes are indicated at 205". In this case, the point effect is beneficial in that it facilitates initiation of the gas discharge.

In another modification which is illustrated in respect to the cavity E5', each electrode consists of one or more points 205'.

The panels with their various electrodes may be made by moulding over the metallic electrodes, the latter having been previously placed in position and held in the mould.

In a variant, the electrodes may be applied on the panels after the latter have been made, or may again be made by selective deposition of material. In this last case, the depositions will be suitably localised by the use of masks, and will be carried out by low pressure application of a metal or an alloy, typically by vacuum evaporation, sublimation or cathodic powder coating. Conventional techniques for reactive evaporation or reactive powder deposition may also be used.

In another arrangement, electrodes are formed on the internal surfaces in facing relationship with the panels 110 and 120. More precisely, and referring now to FIG. 3d in this connection, the two electrodes 206 which are situated in the cavity E6 are formed over the whole area of the panels 110 and 120 corresponding to the illuminated zone Z6. The electrode on the panel 120 (i.e. the base electrode) may be opaque or transparent. By contrast, the electrode formed on the outer panel 110 is transparent so as to allow the emitted light to pass through that panel. This electrode is preferably made by reactive powder deposition of indium and tin with a gas containing oxygen, so as to produce a transparent conductive deposit of indium oxide and tin oxide (ITO). This method of deposition is well known per se.

In addition, for the cavity or cavities which are to emit white light by fluorescence, the fluorescent substances are preferably deposited by the use of one of the known techniques for physical deposition in the vapour phase, such as those mentioned above.

The method which is most preferred is to make all of the panels 110, 120 and (if provided) 130, 140 and 150 of a transparent plastics material, with the faces of these panels being essentially smooth, and with the electrodes being made of a transparent conductive material (e.g. layers of indium oxide and tin oxide as described above). In this way an indicator display unit is obtained which leaves the part of the bodywork C (FIG. 2) of the vehicle that lies behind the display unit actually visible. The rear of the vehicle thus appears in a colour which is essentially homogeneous and uniform over its whole width when the lighting and indicating functions are not in use.

The present invention is of course not in any way limited to the embodiment described above and shown in the drawings: the person skilled in this technical field will be able to conceive of any variant or modification within the spirit of the invention. In particular, the various features of the present invention enable a display unit in the form of a lighting and indicating cluster for the rear of a vehicle to be provided with a side position light and/or a side direction indicator repeater light. In an industrial vehicle, it is similarly possible to provide a clearance indicating light or a beacon.

Other lighting functions which can be provided in this way include a light source for the cabin of the vehicle, a high level stop light, and so on. In this latter case, the sealed envelope is preferably made in a shape which is adapted for any possible inclination of the rear window of the vehicle, so that its light output window extends preferably parallel to the plane of the rear window of the vehicle, and close to the latter.

What is claimed is:

1. A lighting or indicating apparatus for a vehicle comprising a light transmitting element and a base element disposed behind said light transmitting element, wherein the light transmitting element constitutes an outer wall having at least one surface which is at least partly curved, the base element constitutes an inner wall, said outer and inner walls together define a thin envelope defining at least one closed cavity within the outer and inner walls, said at least one closed cavity being gastight for containing gas under low pressure, and the apparatus further includes at least two electrodes situated in the at least one closed cavity, and means connected with the electrodes for applying a voltage for starting and maintaining a luminescent gas discharge in said cavity, said apparatus defining at least one zone having at least two superimposed cavities each containing a gas under low pressure.

2. Apparatus according to claim 1, wherein the said outer and inner walls constitute an outer and an inner panel respectively, secured together in a gastight manner and spaced apart by a substantially constant distance.

3. Apparatus according to claim 1, wherein both of the said panels are transparent.

4. Apparatus according to claim 2, wherein at least one of said panels includes at least one rib extending towards the other panel and secured to the other panel, whereby said envelope defines at least two closed cavities isolated from each other by said rib and lying in side-by-side relationship.

5. Apparatus according to claim 4, wherein each said cavity defines a respective illuminated zone of the apparatus.

6. Apparatus according to claim 5, further including gases contained under low pressure in at least two said cavities and adapted to give rise to gas discharges in different wavelength ranges.

7. Apparatus according to claim 1, wherein one of said walls has an internal face having a fluorescent coating for converting a luminescent gas discharge in a non-visible wavelength to visible light.

8. Apparatus according to claim 1, wherein the said thin envelope defines at least two cavities which are in essentially superimposed relationship in the direction of the thickness of the said envelope, the apparatus further including a transparent separating wall between the said superimposed cavities.

9. Apparatus according to claim 8, further including gases in two said superimposed cavities, said gases being such as to give rise to luminescent discharges of two different colors, the voltage applying means being arranged to apply the voltage to the electrodes of one said cavity at a time, so as to produce a luminescent discharge in one cavity at a time, whereby to give two different lighting or indicating functions in the same illuminated zone.

10. Apparatus according to claim 8, wherein the two said superimposed cavities contain gases for generating luminescent discharges of the same colour, the voltage applying means being arranged to energise both cavities simultaneously, whereby to reinforce the intensity of the light produced at the corresponding illuminated zone of the apparatus.

11. Apparatus according to claim 8, defining at least one zone having three said superimposed cavities, and further including a respective gas in each of the three said cavities under low pressure, such as to emit radiation simultaneously in three primary colours, the apparatus defining an output window in line with the three said superimposed cavities, whereby the radiations produced in the three superimposed cavities are added together at the level of the output window so as to emit white light.

12. Apparatus according to claim 1, wherein the said envelope further includes optical light-controlling means.

13. Apparatus according to claim 12, wherein the said optical light-controlling means comprise catadioptic retroreflective trihedra.

14. Apparatus according to claim 12, wherein the said optical light-controlling means comprise reflective means for light flux diversion.

15. Apparatus according to claim 12, wherein the said optical light-controlling means are formed integrally with the inner face of one of the said walls.

16. Apparatus according to claim 1, wherein at least one said electrode is in the form of an elongated band.

17. Apparatus according to claim 16, wherein the said thin envelope defines a general plane in at least one said cavity, the cavity defining two opposed edges in planes essentially at right angles to the said general plane, with a pair of electrodes arranged in the cavity along the two said edges thereof.

18. Apparatus according to claim 16, wherein at least one said cavity defines an elongate edge thereof and a region of the cavity opposed to the said edge, with a pair of electrodes in the cavity, comprising a first electrode in the form of a band extending along the said edge, together with a second electrode in the form of a point and disposed in the said opposed region of the cavity.

19. Apparatus according to claim 1, wherein a wall of the envelope defines an internal face thereof, with, in at least one said cavity, at least one electrode extending on the internal face of said wall in that cavity, over substantially the whole extent of that cavity.

20. Apparatus according to claim 1, wherein at least one said electrode is of a transparent conductive metal oxide.

21. Apparatus according to claim 1, wherein at least one said electrode is formed by physical vapour phase metal deposition.

22. Apparatus according to claim 1, wherein the said envelope is of plastics material moulded over the said electrodes.

23. Apparatus of claim 1 wherein said apparatus is a vehicle headlight, a vehicle signal light, a vehicle stop light or a vehicle courtesy light.

\* \* \* \* \*